(12) United States Patent
Brudniok et al.

(10) Patent No.: US 8,812,158 B2
(45) Date of Patent: Aug. 19, 2014

(54) METHOD AND HANDLING SYSTEM FOR AUTOMATICALLY MOVING A GRAVITY-COMPENSATED LOAD BODY

(75) Inventors: Sven Brudniok, Augsburg (DE); Günter Schreiber, Friedberg (DE); Johann Maischberger, Dinkelscherben (DE)

(73) Assignee: KUKA Roboter GmbH, Augsburg (DE)

( * ) Notice: Subject to any disclaimer, the term of this patent is extended or adjusted under 35 U.S.C. 154(b) by 165 days.

(21) Appl. No.: 13/439,922

(22) Filed: Apr. 5, 2012

(65) Prior Publication Data
US 2013/0013109 A1    Jan. 10, 2013

(30) Foreign Application Priority Data
Apr. 7, 2011 (DE) .......................... 10 2011 006 992

(51) Int. Cl.
*B25J 19/00* (2006.01)
(52) U.S. Cl.
CPC .................................. *B25J 19/0008* (2013.01)
USPC ............................ 700/254; 700/245; 700/258
(58) Field of Classification Search
CPC . B62D 57/032; G05D 1/0274; G05D 1/0246; G05D 1/0255; G05D 1/0242
See application file for complete search history.

(56) References Cited

U.S. PATENT DOCUMENTS

| | | | | |
|---|---|---|---|---|
| 4,177,002 A | * | 12/1979 | Motoda et al. | 414/751.1 |
| 5,415,057 A | * | 5/1995 | Nihei et al. | 74/490.01 |
| 6,343,243 B1 | * | 1/2002 | Brogardh et al. | 700/258 |
| 6,899,308 B2 | * | 5/2005 | Chow et al. | 248/282.1 |
| 2006/0259165 A1 | * | 11/2006 | Stommen et al. | 700/71 |
| 2008/0131248 A1 | * | 6/2008 | Friz et al. | 414/561 |
| 2008/0258670 A1 | * | 10/2008 | Yoshikawa | 318/568.22 |
| 2008/0277552 A1 | * | 11/2008 | Duval | 248/280.11 |
| 2009/0134107 A1 | * | 5/2009 | Doggett et al. | 212/239 |
| 2011/0048649 A1 | * | 3/2011 | Komatsu et al. | 157/1.35 |
| 2011/0072929 A1 | * | 3/2011 | Feng | 74/479.01 |

FOREIGN PATENT DOCUMENTS

| | | |
|---|---|---|
| CN | 101 913 153 | 12/2010 |
| DE | 10 2008 032 322 A1 | 4/2009 |
| DE | 10 2010 027 280 A1 | 1/2012 |
| JP | 5-123993 | 5/1993 |
| JP | 2000-271887 | 10/2000 |
| JP | 2009-262302 A | 11/2009 |
| WO | 80/01774 A1 | 9/1980 |
| WO | 2012/019324 A1 | 2/2012 |

OTHER PUBLICATIONS

German Patent Office; Search Report in German Patent Application No. 10 2011 006 992.5 dated Apr. 22, 2013; 5 pages.
European Patent Office; Search Report in European Patent Application No. 12161840.9 dated Aug. 6, 2012; 6 pages.

* cited by examiner

*Primary Examiner* — Ian Jen
(74) *Attorney, Agent, or Firm* — Wood, Herron & Evans, LLP

(57) ABSTRACT

A handling system and method for automatically moving a gravity-based load body using a robot. The load body is supported by a load body holding means connected to an end effector flange of the robot. A gravity compensation device includes a connector element acting on an element or the end effector flange of the robot to compensate for the gravity of the load body.

9 Claims, 6 Drawing Sheets

Figure 1:
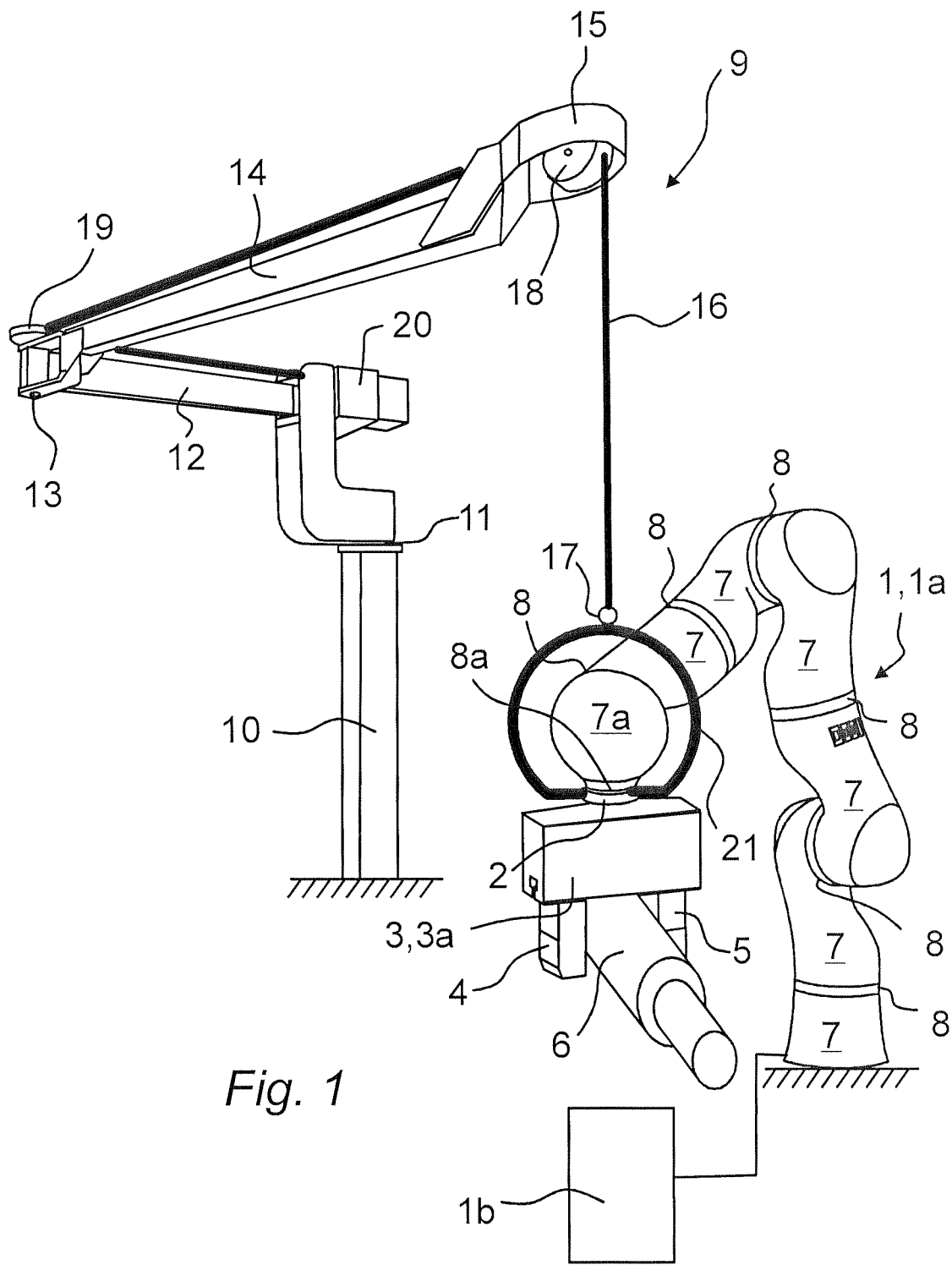

METHOD AND HANDLING SYSTEM FOR AUTOMATICALLY MOVING A GRAVITY-COMPENSATED LOAD BODY

The invention relates to a method for automatically moving a gravity-compensated load body and to an automated handling system having a gravity compensation device for a load body.

DE 10 2008 032 322 A1 discloses a method for assembling two components by means of a lightweight robot, in which a first component is picked up by the robot, and at least a partial region of said component is then inserted into an opening in a second component, wherein the two components come into contact with one another early in the process. During the insertion movement, the lightweight robot moves the first component at least partially in an oscillating fashion. Within this context, a lightweight robot is a robot that has a low permanent weight as compared with its load bearing capacity, and has a precise force control. As a result of the low permanent weight and the precise control, it is possible to bring components in contact with one another even early during their mutual assembly process, without resulting in damage to the components.

From US 2011/0048649 A1, an automatic tire mounting device is known, in which a lug nut mounting tool is held balanced by means of a gravity compensation device, which is connected directly to the lug nut mounting tool, wherein a separate industrial robot is equipped with a gripping device, which grips the balanced lug nut mounting tool for the purpose of automatically moving said tool.

The problem addressed by the invention is that of providing an alternative, particularly improved method and handling system for automatically moving a gravity-compensated load body.

The problem is solved by a method for automatically moving a gravity-compensated load body, in which the load body is supported by a load body holding means, which is connected to an end effector flange of a robot for automatically moving the load body, wherein a gravity compensation device is provided, which has a connector element, which acts on an link or on the end effector flange of the robot so as to compensate for the gravity of the load body.

In the method according to the invention, therefore, the load body is not suspended directly from the gravity compensation device, rather, the load body is attached to a load body holding means, which is connected to the end effector flange of the robot, wherein the gravity compensation device then acts on the robot, particularly on the end effector flange of the robot, rather than acting directly on the load body or on the load body holding means. The robot can comprise a manipulator arm and a control device. The control device can be configured to move the manipulator arm automatically. The load body can be a component, for example, which is to be positioned and/or mounted within the course of an assembly process. The load body holding means can be an end effector of the robot. The load body holding means can particularly be a gripping device, which is attached, permanently connected, i.e., flange-connected to the end effector flange of the robot.

With the method according to the invention, the load body is supported predominantly, particularly at least largely or completely, by the gravity compensation device, in that the gravity compensation device applies a force to the load body via the end effector flange of the robot, which force counteracts the force of gravity. In addition, forces can be transferred which have a component that does not counteract the force of gravity. The force is generally directed from the flange of the robot toward the gravity compensation device. Thus the robot arm is able to move a load body which has a greater, particularly a far greater mass than could be held by the robot arm alone based upon the load-bearing capacity of the robot. The robot is used, at least largely or entirely, for maneuvering the load body in space, without requiring that the robot be embodied or configured to fully support the load body.

The connector element of the gravity compensation device can be coupled via an articulated joint to the end effector flange of the robot, with at least one, particularly with at least three degrees of freedom. The connector element represents a means for connecting the gravity compensation device to the end effector flange of the robot. The connector element can be connected via an articulated joint or a joint assembly to the end effector flange of the robot. The articulated joint or the joint assembly can have three rotational degrees of freedom, for example.

The connector element of the gravity compensation device can be connected to the link of the robot, particularly to the end effector flange of the robot, via a joint coupling, which particularly has three rotational degrees of freedom. The joint coupling is preferably coupled to the end effector flange of the robot. However, the joint coupling can also be coupled to another link of the robot. To this extent, the end effector flange forms only one special link of the robot, specifically the distal end link of the robot.

If the gravity compensation device is coupled to a different link of the robot from the link to which the load body holding means is attached, it must be ensured that the links and/or joints of the robot that lie between the connector element of the gravity compensation device and the load body holding means are capable of transferring the carrying forces resulting from the mass of the load body and gravity and/or can be transferred by inertial forces. In the simplest case, however, the gravity compensation device is to be coupled directly to the end effector flange of the robot, to which the load body holding means is directly flange-connected, so that no links and/or joints of the robot lie between these.

In all embodiments, the gravity compensation device can be moved along passively, particularly without its own drive, solely on the basis of an active movement of the robot and/or the load body. Therefore, the gravity compensation device need not be equipped with its own drives, and can instead be embodied as a predominantly or exclusively mechanical joint assembly. In one embodiment example, the gravity compensation device can be formed by a mechanical articulated cantilever arm with two degrees of freedom, the cantilevered end of which is infinitely adjustable within a horizontal plane. In this case, the load body can be suspended from a crane-like hoisting cable, for example, which extends downward from the cantilevered end of the mechanical articulated cantilever arm. To this extent, the load body hangs "freely swinging", i.e., supported only by the cable, in the air. The cable can be attached to a device which exerts a lifting force on the cable, corresponding at least approximately to the gravity of the load body.

In one embodiment, the gravity compensation device can compensate exclusively for the gravity resulting from the mass of the load body. In this case, the robot must also apply a certain carrying force, specifically, for example, for lifting the load body holding means and/or the end effector flange, and/or due to the additional momenta that result when the load body is tilted about the horizontal axis. The force need not necessarily extend through the center of gravity of the load body. Moreover, dynamic forces can or must be at least partially or fully absorbed.

In an alternative embodiment, in addition to compensating for the Gravitational force resulting from the mass of the load body, the gravity compensation device can also compensate for the gravitational force resulting from the mass of the load body holding means and/or from the mass of the end effector flange and/or one or more of the links of the robot. Thus the robot arm can also be relieved of the weight resulting from the masses of the load body holding means and/or individual links, particularly the end effector flange, by the gravity compensation device.

The problem is further solved by an automated handling system, Particularly for implementing a method according to the invention, as described, having a gravity compensation device for a load body which is equipped on the load side with a connector element, a load body holding means, and a robot for automatically moving the gravity-compensated load body, which robot has an end effector flange, wherein the connector element of the gravity compensation device is attached by means of a joint coupling to link or to the end effector flange of the robot.

With the automated handling system according to the invention, the load body therefore is not suspended directly from the gravity compensation device, and instead, the load body is fastened to a load body holding means, which is connected to the end effector flange of the robot, wherein the gravity compensation device then acts via a joint coupling on the robot, particularly on the end effector flange of the robot, rather than directly on the load body or the load body holding means. The robot can comprise a manipulator arm and a control device. The control device can be configured to automatically move the manipulator arm. The load body can be, for example, a component that is to be positioned or mounted during the course of an assembly process. The load body holding means can be an end effector of the robot. The load body holding means can particularly be a gripper, which is attached, permanently connected, i.e., flange-connected, to the end effector flange of the robot.

The connector element of the gravity compensation device can be coupled by means of the joint coupling to the end effector flange of the robot, with at least one, particularly three degrees of freedom.

The connector element represents a means for connecting the gravity compensation device to the end effector flange of the robot. The connector element can be connected via the joint coupling to the end effector flange of the robot. The joint coupling can have three rotational degrees of freedom, for example.

In one special embodiment, the articulated joint of the robot which Connects the end effector flange to a link that immediately precedes the end effector flange of the robot in the kinematic chain can be embodied as a swivel joint.

In all embodiments of the automated handling system, the joint coupling can have a connecting element which is rotatably connected to the robot link, particularly to the end effector flange, and which is connected by means of at least one articulated joint, particularly one swivel joint, to a holding element, which is coupled to the connector element of the gravity compensation device.

The connecting element can have an annular body, mounted so as to Rotate about a first rotational axis on the link of the robot, particularly on the end effector flange, which annular body is rotatably mounted on a partially annular and/or stirrup-shaped holding element by means of two opposite, particularly radially outward facing, swivel joints that lie on a shared second rotational axis, which holding element is in turn connected to the connector element of the gravity compensation device so as to rotate about a third rotational axis.

The end effector flange represents a special link of the robot. If the end effector flange is rotatably mounted on the last joint of the robot arm, the connecting element can be rotatably mounted on the end effector flange via a roller bearing or friction bearing.

The joint coupling can have a stirrup-shaped holding element. The stirrup-shaped holding element can extend along a circular path about an angle of approximately 270 degrees. The radius of said circular path can be chosen large enough that an a link close to the end effector flange is able to dip completely into an open space encompassed by the stirrup-shaped holding element. In an area of the upper end, the stirrup-shaped holding element can have an inward-facing notch, into which a connector element of the gravity compensation device, embodied as annular, engages. The connector element can either be connected by means of a swivel joint connection to the cable, or can be fastened directly to the cable, wherein rotatability can be achieved by twisting the cable.

The stirrup-shaped holding element can be embodied as symmetrical. On each of two opposite end sections of the stirrup-shaped holding element, a swivel joint can be arranged. The two swivel joints lie particularly on a shared rotational axis. A connecting element in the form of an annular body can be mounted on the two swivel joints. The annular body can form an outer ring of a bearing, particularly a roller bearing or friction bearing. The annular body can also be embodied as a separate component which is connected to an outer ring of a bearing, particularly a roller bearing or friction bearing. Accordingly, the bearing or the inner ring thereof can be permanently connected to the end effector flange. To this extent, the annular body is rotatably mounted on the end effector flange.

With the joint coupling and the cable, a joint coupling having three rotational degrees of freedom can be created, via which the end effector flange of the robot is connected to the gravity compensation device.

Gravity compensation devices, which are also referred to as balancing systems, for example, are generally used for manual applications, to enable humans to move heavy objects to a new position using a light application of force.

A mechanism of the balancing system makes it possible to apply force to an object in a vertical direction and thereby raise it. In this case, the user determines the height to which the object will be raised. A lateral displacement of the object can be effected manually by the user. The mechanism of the balancer can be embodied to enable such a lateral displacement.

The mechanism of the balancer can be connected via an additional mechanism, which is also referred to as a load body holding means or in what follows also as an object holder, to the object to be lifted. This object holder can be equipped with additional, particularly active degrees of freedom, which can be actuated by the user. For instance, the load body holding means can be embodied as a gripper, which can be adjusted between an opened position and a closed position, in which the load body is gripped.

Balancing systems of this type can also be used by robots. In this case, the robot actively moves the object, for example, in the plane and the weight of the object to be lifted is lifted partially or entirely by the balancer. The movements of the balancer in the vertical plane are then triggered or effected by the robot. In this case, the overall construction of the system, which comprises the balancer and the object holder, can be embodied as identical to a manually used balancer system. The object holder acts on the object to be lifted, and the robot acts on the object or the object holder.

Supporting a robot with a balancing system allows the robot to move, with at least reduced dynamics, objects for the weight of which the robot actually is not equipped. Such objects are to be brought by the robot, supported by the balancer, into a new position in an environment that has interfering contours. The problem with using such a balancer system in conjunction with a robot is the large interfering contour of an object holder that is adapted to the balancer system, i.e., to the gravity compensation device. As a result of this, the entire system of balancer and object holder would have to be redesigned for each use to allow the interfering contours to be positioned in a site that is non-problematic for the respective task.

This is where the invention comes in, the goal of which is to design a method for automatically moving a gravity-compensated load body and an automated handling system, in which the normal movements of the robot are supported by a gravity compensation device, without requiring that the object holder, i.e., the load body holding means, be designed in consideration of the gravity compensation device, and instead, the load body holding means can be embodied in accordance with the handling robot and the task at hand, particularly an assembly task. As a result, large interfering contours can be avoided. With a balancing system of this type, then, the largest possible number of standard tasks for robots can be supported, without requiring any adaptation.

A body, i.e., a load body, can be moved by the robot in space within six degrees of freedom. The balancer will not restrict possible movements, and will take up all or part of the weight of the load body. The balancer and/or the load body holding means also have the fewest possible interfering contours that can lead to collision problems in the working environment.

In one embodiment of the invention, the functions to be performed by the overall system are divided into partial functions and are assigned to system sections. In this case, the balancer can enable one movement in one plane. The lifting mechanism enables the lifting of the object. This function can also be integrated into the balancer, depending upon the mechanism of the balancer. The object holder can be connected to the object to be lifted, and can enable the rotation of the object about individual or about all spatial axes.

In one embodiment, the rotational movements of the object are enabled by the flange of the robot. In this case, the vertical force of the balancer is applied directly to the flange of the robot, thereby relieving links and/or driven joints of the robot. The mechanism with which force is transferred to the flange restricts the movements of the robot only slightly. The mechanism with which force is transferred to the flange forms only a small interfering contour, particularly about a rotational axis of the robot.

The flange of the robot can be extended by a small length, for example, 15 mm. Between the flange of the robot and the object to be lifted and around the object, no additional interfering contour is produced.

In one embodiment example, force is transferred to the flange via a suspension assembly, which has three passive degrees of freedom. The suspension assembly is connected via a first bearing to the flange of the robot, wherein the flange is able to rotate freely. The mount for the outer ring of the bearing is held by a ring, with which it is connected so as to articulate via a second bearing. The ring is further held from the top. This connection is able to rotate orthogonally about itself, i.e., about an axis, which to this extent forms a third bearing. Via this connection, the force is applied to the suspension assembly, which pulls vertically upward and/or in the direction of the gravity compensation device. The inner diameter of the ring of the suspension assembly is large enough that the at least one link of the robot that precedes said ring in the kinematic chain is able to enter into the ring without colliding with it.

The angular position of the suspension assembly is always definite as long as the angle between the first rotational axis and the holding force direction of the balancer is not equal to zero. The suspension assembly has the property that as long as that angle is not equal to zero, the force on the suspension assembly always extends vertically through the point of intersection of the three rotational axes of the suspension assembly, which is located at the center of the flange. The force also extends through the intersection point when the angle is equal to zero. However, the position of the joint on the flange then is no longer definite.

If the flange of the robot is oriented orthogonally to the holding force direction, the first and third rotational axes of the suspension assembly are coaxial to one another and can therefore rotate freely relative to one another. Moreover, in this position, the suspension assembly is not equipped with a separate joint that would enable a rotation of the second to the last swivel joint of the robot. Instead, the transfer of force to the ring at the suspension point can rotate, thereby enabling movement of the robot.

To ensure that the angular positions of the suspension assembly are definite when the flange is moved out of the position in which the flange is oriented orthogonally to the direction of holding force, the movement of the robot must fulfill one condition. First, the flange of the robot must be tilted forward, resulting in a positive angle, which in FIG. 3 and FIG. 6, for example, can pivot out of the plane of the drawing. This ensures that the angular positions of the suspension assembly are definite.

In one variant of the system comprising balancer and hoisting mechanism, the hoisting mechanism can consist of a cable winch, which is rigidly attached to a ceiling above a working point of the robot. In this case, the force exerted on the suspension assembly of the robot no longer extends vertically upward when the robot flange moves away from the working point. The ceiling is located far enough above the working point of the robot that the robot is able to handle the lateral forces occurring when the robot moves its flange to the side away from the working point.

In an alternative variant of the system comprising balancer and hoisting mechanism, the hoisting mechanism can consist of a cable winch which is attached to the ceiling via a linear guide. In its working space, the robot uses two points at which it requires a supporting force, which is applied vertically from the top, or uses multiple points, which lie at least approximately along a straight line. Between the two working points, the linear guide is attached to the ceiling in such a way that each of the ends is located above a working point. The linear guide can further be equipped with brakes and/or shock absorbers at the end points where a guide block can come to rest directly above its working points when said block is drawn with a certain dynamic to these positions.

One embodiment example of the invention is illustrated by way of example in the attached set of schematic drawings.

Figure 2:
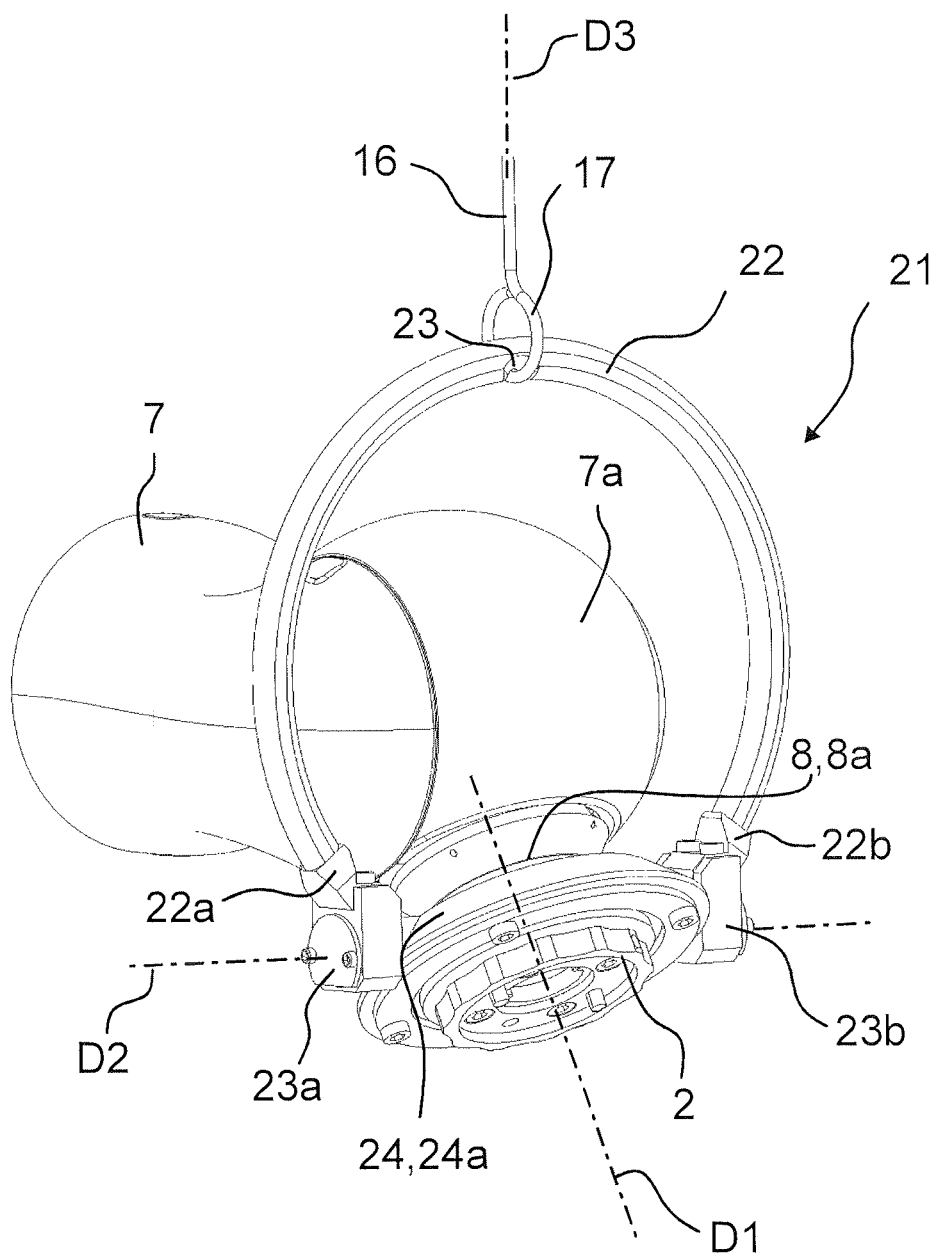
Figure 3:
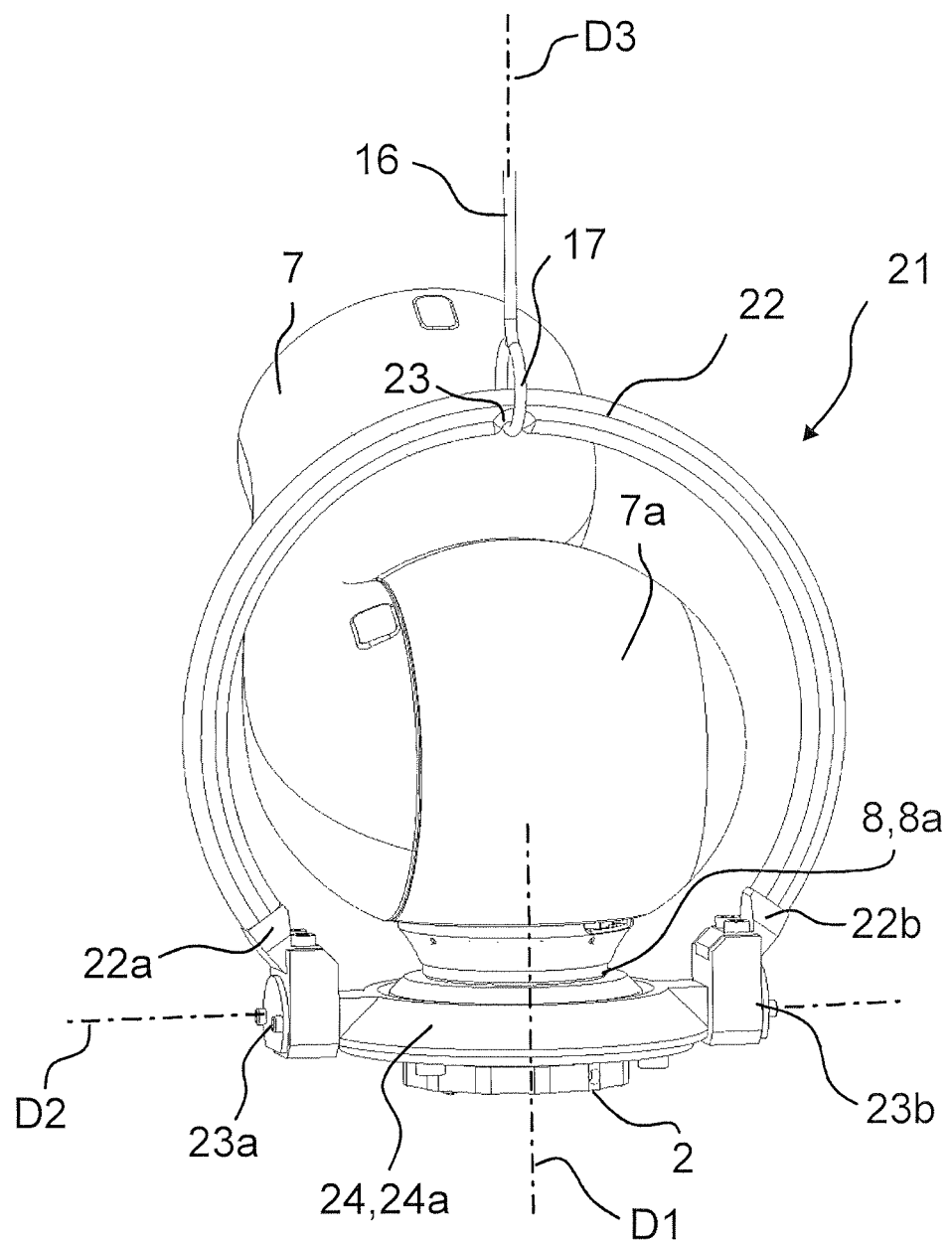
Figure 4:
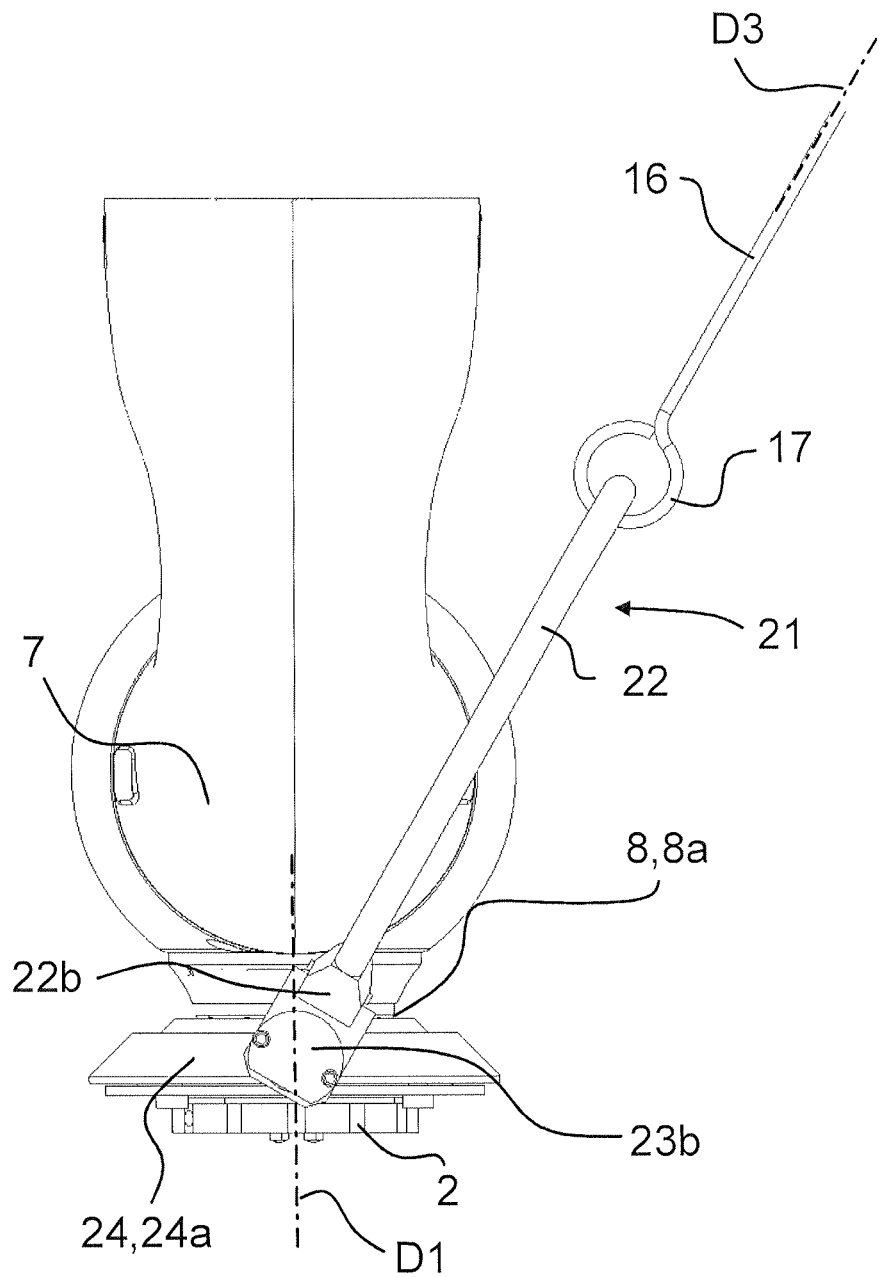
Figure 5:
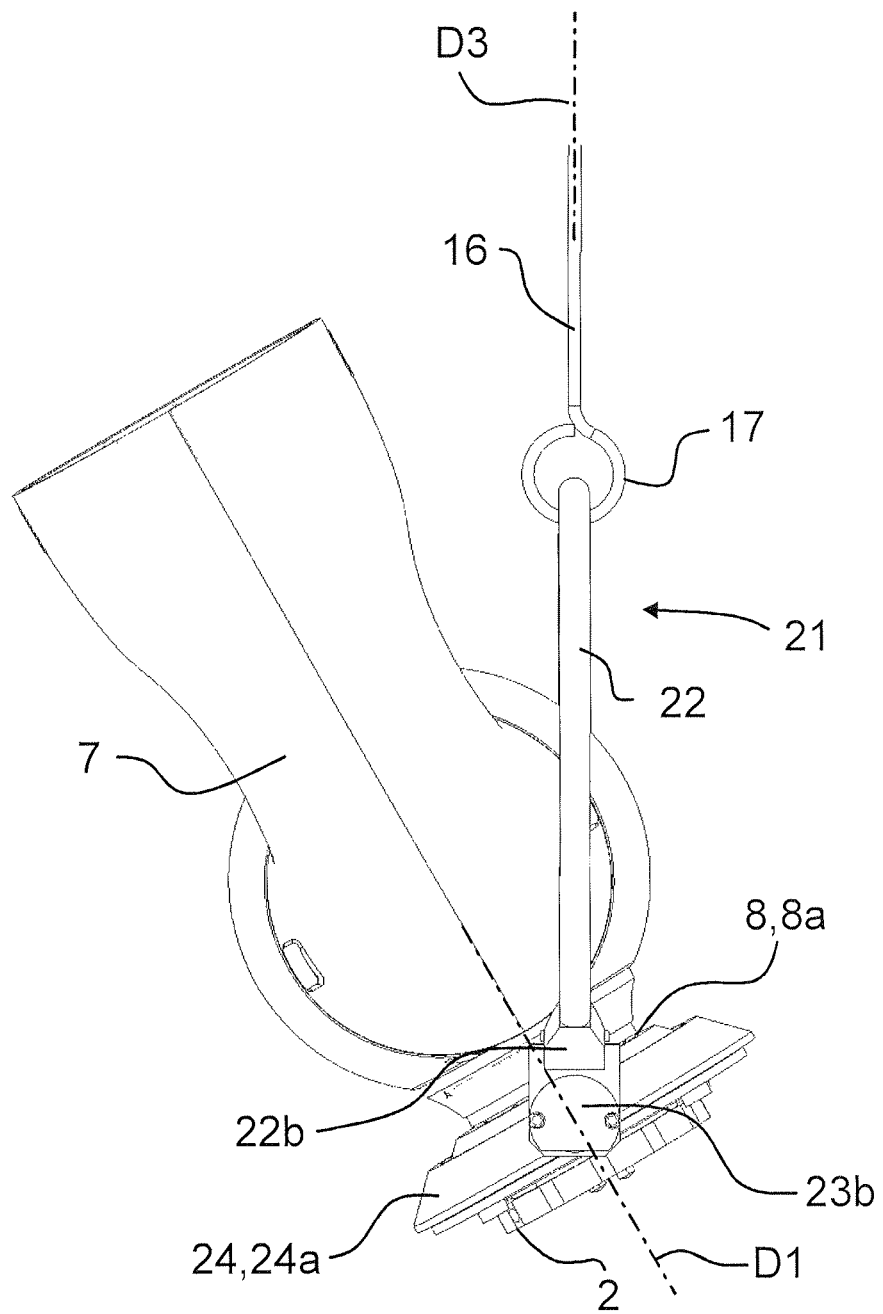
Figure 6:
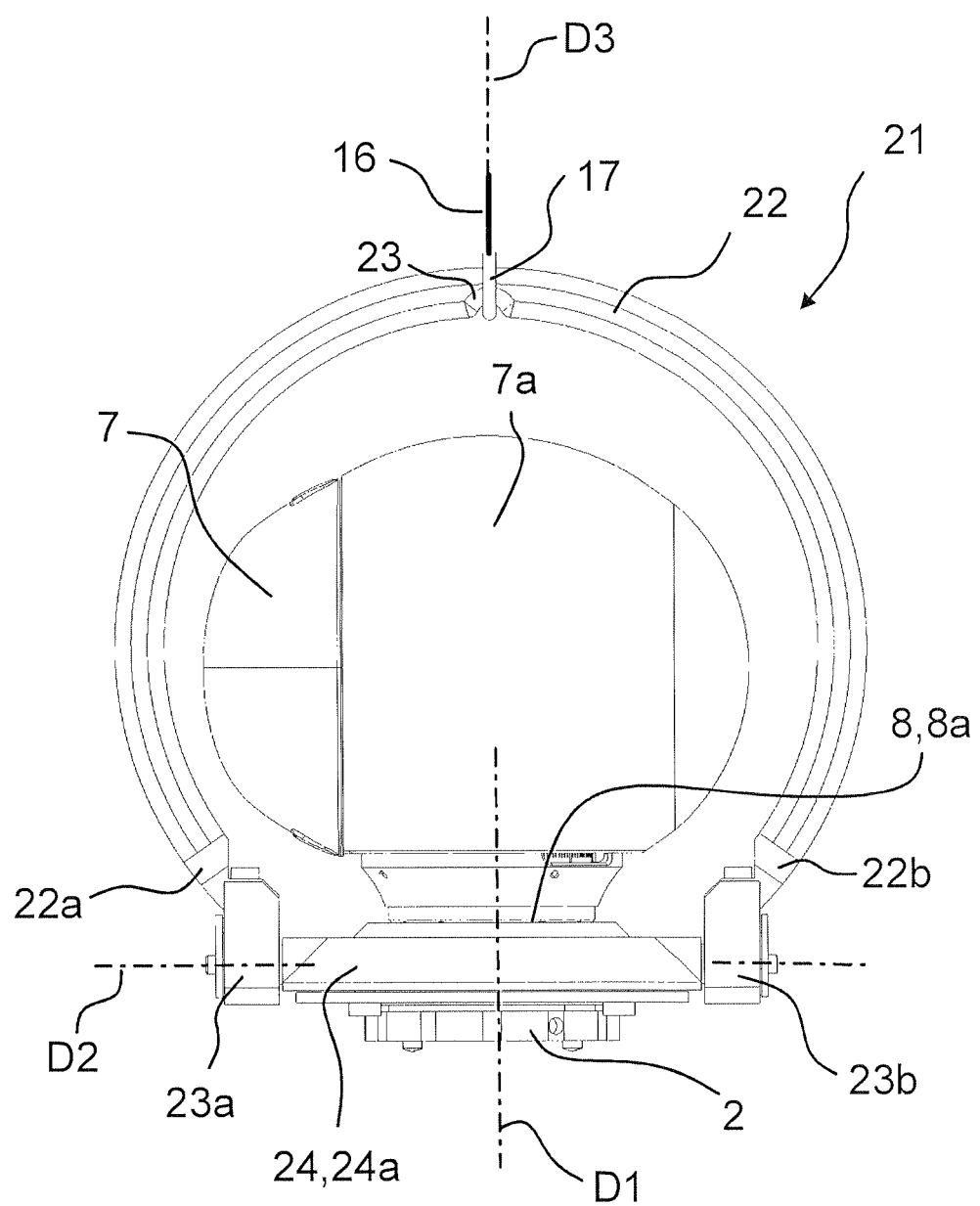

The drawings show:

FIG. 1 a schematic, perspective illustration of an automated handling system having a gravity compensation device, a load body and a robot, FIG. 2 a first perspective partial view of the robot in the area of its flange with an embodiment of a joint coupling according to the invention, FIG. 3 a second perspective partial view of the robot in the area of the flange with the joint coupling according to FIG. 1, FIG. 4 a first side view of the robot in the area of the flange with the joint coupling according to FIG. 1, FIG. 5 a second side view of the robot in the area of the flange with the joint coupling according to FIG. 1 and FIG. 6 a front view of the robot in the area of the flange with the joint coupling according to FIG. 1.

FIG. 1 shows a robot 1, more particularly, an industrial robot. By way of example, the illustrated embodiment example according to the invention involves a lightweight robot of the KUKA LBR III type. The robot 1 comprises a manipulator arm 1a and a control device 1b. The manipulator arm 1a has on its end effector flange 2 an end effector 3a, particularly in the form of a gripper, which will also be referred to in the following as a load body holding means 3, for example. The end effector 3a can also be specifically referred to as a gripper. The illustrated end effector 3a can have two gripper jaws 4 and 5 that are movable relative to one another. Between the gripper jaws 4 and 5, a load body 6 is held. The manipulator arm 1a has links 7, which are connected to one another by joints 8. By moving the joints 8 of the manipulator arm 1a, the end effector 3a and consequently the load body 6 is moved. The load body 6 can be a machine component, for example, which is to be moved within the framework of manufacturing a machine, during the assembly thereof. The control device 1b is configured for automatically moving the manipulator arm 1a.

According to the invention, the load body 6 is gravity-compensated not by the manipulator arm 1a but by a separate gravity compensation device 9. The gravity compensation device 9, as illustrated in the embodiment example shown, can have a permanently installed vertical column 10. Via a first passive swivel joint 11 a cantilever arm 12 of the gravity compensation device 9 can be pivotably rotated about a first vertical axis. A supporting arm 14 is connected to this cantilever arm 12 via a second passive swivel joint 13. At a freely cantilevered end 15 of the supporting arm 14, in the embodiment example, a cable 16 extends vertically downward. In an alternative embodiment, not shown, rather than a cable 16 a rod can be used. A rod has the advantage that it is also capable of transferring transverse forces during a passive displacement of the balancer. The free end of the cable 16 is equipped with a connector element 17. By means of the two passive swivel joints 11 and 13, the freely cantilevered end 15 of the supporting arm 14 can be passively moved within a horizontally oriented plane. By means of the cable 16, which is fed via a first pulley 18 and a second pulley 19 to a balancing device 20, the cable 16 or the connector element 17 can be lowered and/or raised in a vertical direction on the basis of the segment of the cable 16 that extends in the direction of gravitational force. Depending upon the gravitational force acting on the connector element 17 and induced by the mass of the load body 6, the balancing device 20 can be configured to exert a lifting force on the cable 16, which counteracts the gravitational force acting on the connector element 17 and induced by the mass of the load body 6, more particularly, the lifting force corresponds in terms of extent to the gravitational force, so that the load body 6 on the cable 16 is suspended so as to swing freely.

According to the invention, the load body 6 is held by a load body Holding means 3, which is fastened not directly to the cable 16 of the gravity compensation device 9, but to the end effector flange 2 of the robot 1. To compensate for the gravitational force on the load body 6, it is provided according to the invention that the gravity compensation device 9 acts not directly on the load body 6 but on a link 7 of the robot 1. To this end, it is provided that the connector element 17 of the gravity compensation device 9 is connected via a joint coupling 21 to a link 7, particularly to the end effector flange 2 of the robot 1.

One example of a variant of a joint coupling 21 according to the invention is shown in detail in FIG. 2. The joint coupling 21 has a stirrup-shaped holding element 22. The stirrup-shaped holding element 22 extends along a circular path about an angle of approximately 270 degrees. The radius of this circular path is selected to be large enough that a link 7a near the end effector flange 2 is able to enter all the way into an open space encompassed by the stirrup-shaped holding element 22. In a region of the upper end, the stirrup-shaped holding element 22 has an inward-facing notch 23, into which a connector element 17 of the gravity compensation device 9, embodied as annular, engages. The connector element 17 can either be connected by means of a swivel joint connection to the cable 16 or the rod, or can be attached directly to the cable 16, wherein the ability to rotate about the rotational axis D3 can be achieved by twisting the cable 16.

The stirrup-shaped holding element 22 is embodied as symmetrical. At each of the two opposing end sections 22a, 22b of the stirrup-shaped holding element 22, a swivel joint 23a, 23b is arranged. The two swivel joints 23a, 23b lie on a shared rotational axis D2. On the two swivel joints 23a, 23b, a connecting element 24 in the form of an annular body 24a is mounted. The annular body 24a forms an outer ring of a bearing, particularly a roller bearing or friction bearing. The annular body 24a can also be embodied as a separate component which is connected to an outer ring of a bearing, particularly a roller bearing or friction bearing. The bearing or the inner ring thereof is accordingly permanently connected to the end effector flange 2. To this extent, the annular body 24a is mounted on the end effector flange 2 so as to rotate about a rotational axis D1.

The joint coupling 21 and the cable 16 result in a joint coupling 21 having three rotational degrees of freedom, via which the end effector flange 2 of the robot 1 is connected to the gravity compensation device 9.

In FIG. 3, as in FIG. 2, the robot 1 is shown in the area of the flange with the joint coupling. However, the end effector flange 2 is shown rotated out of the orientation shown in FIG. 2 to a vertical orientation. In this vertical orientation, the leading spherical link 7a of the manipulator arm 1a has entered into the stirrup-shaped holding element 22. Rather than a circular basic form, the stirrup-shaped holding element 22 can also have other basic forms, including, for example, a rectangular, square, or triangular basic form. In any case, the basic form and/or size can be selected such that depending on the shape of the leading link 7a of the manipulator arm 1a, which can have a shape other than a spherical shape, it is ensured that the link 7a is able to enter into the holding element 22.

FIG. 4 shows the robot 1 with the end effector flange 2, which is rotated into a vertical orientation. In this case, however, the cable 16 is in an orientation other than a vertical orientation. In other words, the gravity compensation device 9 is not located vertically above the end effector flange 2, and is instead slightly offset laterally. In such an arrangement, the manipulator arm 1a must absorb a transverse force acting in a horizontal direction, which acts on the end effector flange 2 as a result of a lifting force along the cable 16.

In one arrangement, as illustrated in FIG. 5, the manipulator arm 1a or the end effector flange 2 is oriented tilted a certain angle outward from vertical. At the same time, the cable 16 extends in a vertical direction, so that no transverse forces act on the end effector flange 2. However, a load body holding means or a load body attached to the end effector flange 2 will apply torque to the end effector flange 2, which torque must be absorbed by the manipulator arm 1a.

FIG. 6 shows a further view of the manipulator arm 1a in the area of the end effector flange 2 with the joint coupling 21. The end effector flange 2 extends in a horizontal plane, i.e., the rotational axis D1 about which the end effector flange 2 rotates is oriented vertically. At the same time, the cable 16 extends in a vertical direction, so that no transverse forces are acting on the end effector flange 2, and the gravitational force induced as a result of the mass of a load body suspended from the end effector flange 2 can be applied to the cable 16 via the joint coupling 21, and the manipulator arm 1a is relieved of the need to absorb the resulting forces. However, in this position, the angular position of outer ring 24 relative to inner ring is no longer defined.

The invention claimed is:

1. A method for automatically moving a gravity-compensated load body, comprising:
    supporting the load body by a load body holding means, which is connected to an end effector flange of a robot for automatically moving the load body, and
    providing a gravity compensation device, which has a connector element that acts on the end effector flange of the robot for the purpose of compensating for the gravity of the load body, wherein the connector element of the gravity compensation device is coupled via a joint to the end effector flange of the robot with three degrees of freedom.

2. The method according to claim 1, in which the connector element of the gravity compensation device is connected to the end effector flange of the robot, via a joint coupling, which particularly has three rotational degrees of freedom.

3. The method according to claim 1, in which the gravity compensation device is moved along passively, particularly without its own drive, solely as a result of an active movement of the robot and/or of the load body.

4. The method according to claim 1, in which the gravity compensation device compensates exclusively for the gravitational force resulting from the mass of the load body.

5. The method according to claim 1, in which the gravity compensation device also compensates for the gravitational force resulting from the mass of the load body holding means and/or from the mass of the end effector flange and/or from one or more of the links of the robot, in addition to the gravitational force resulting from the mass of the load body.

6. An automated handling system for automatically moving a gravity-compensated load body comprising:
    a gravity compensation device for a load body which device is equipped on the load side with a connector element,
    a load body holding means, and
    a robot for automatically moving the gravity-compensated load body, which robot has an end effector flange,
    wherein the connector element of the gravity compensation device is connected by a joint coupling to the end effector flange of the robot with three degrees of freedom.

7. The automated handling system according to claim 6, wherein the joint of the robot which connects the end effector flange to a link that directly precedes the end effector flange of the robot in the kinematic chain is embodied as a swivel joint.

8. The automated handling system according to claim 6, wherein the joint coupling has a connecting element, which is rotatably connected to the end effector flange, and which is connected by means of at least one joint, particularly swivel joint, to a holding element, which is coupled to the connector element of the gravity compensation device.

9. The automated handling system according to claim 8, wherein the connecting element has an annular body mounted on the end effector flange, so as to rotate about a first rotational axis, which annular body is rotatably mounted on a partially annular and/or stirrup-shaped holding element by means of two opposing swivel joints, which particularly face radially outward and lie on a shared second rotational axis, said holding element in turn being connected to the connector element of the gravity compensation device so as to rotate about a third rotational axis.

* * * * *